(12) United States Patent
Burg et al.

(10) Patent No.: US 8,781,845 B1
(45) Date of Patent: Jul. 15, 2014

(54) SERVICE CONFIGURATION MANAGEMENT SYSTEM AND METHOD

(75) Inventors: Bernard Burg, Menlo Park, CA (US); Kannan Govindarajan, Palo Alto, CA (US); Harumi Anne Kuno, Palo Alto, CA (US); Kevin L. Smathers, Palo Alto, CA (US); Kei Yuasa, Palo Alto, CA (US); Jeannie C. Louie, San Francisco, CA (US); Richard Smolucha, Bridgewater, NJ (US); F. Paul Carau, Jr., Ft. Collins, CO (US); Kai W. Young, East Brunswick, NJ (US); Philip R. Seastrand, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2767 days.

(21) Appl. No.: 11/390,225

(22) Filed: Mar. 27, 2006

(51) Int. Cl.
*G06Q 10/00* (2012.01)
(52) U.S. Cl.
USPC .......................................... 705/1.1; 705/300
(58) Field of Classification Search
USPC .................................................. 705/1.1, 300
See application file for complete search history.

(56) References Cited

U.S. PATENT DOCUMENTS

| | | | |
|---|---|---|---|
| 6,184,888 B1 | 2/2001 | Yuasa et al. | |
| 6,396,503 B1 | 5/2002 | Goss et al. | |
| 6,522,336 B1 | 2/2003 | Yuasa | |
| 6,782,238 B2 | 8/2004 | Burg et al. | |
| 6,845,380 B2 | 1/2005 | Su et al. | |
| 7,568,017 B2 * | 7/2009 | Shah et al. | 709/221 |
| 2002/0120474 A1 * | 8/2002 | Hele et al. | 705/4 |
| 2002/0184349 A1 * | 12/2002 | Manukyan | 709/221 |
| 2003/0179230 A1 * | 9/2003 | Seidman | 345/750 |
| 2006/0064313 A1 * | 3/2006 | Steinbarth et al. | 705/1 |
| 2007/0179825 A1 * | 8/2007 | Dreiling et al. | 705/7 |

OTHER PUBLICATIONS

U.S. Appl. No. 11/104,080, Burg et al., filed Apr. 12, 2005.
U.S. Appl. No. 11/243,693, Kuno et al., filed Oct. 5, 2005.

* cited by examiner

*Primary Examiner* — Lynda Jasmin
*Assistant Examiner* — Sangeeta Bahl

(57) ABSTRACT

Embodiments of the present invention generally relate to a method for service configuration management. One embodiment of the present invention includes providing a configuration question and capturing an answer to the question. The embodiment also includes linking the answer to a requirement, tracing the requirement to a potential solution, and storing integrated information. Further, the integrated information of the embodiment includes the requirement, the potential solution, and a link between the requirement and the potential solution.

20 Claims, 5 Drawing Sheets

SERVICE CONFIGURATION MANAGEMENT SYSTEM AND METHOD

BACKGROUND

This section is intended to introduce the reader to various aspects of art, which may be related to various aspects of the present invention that are described or claimed below. This discussion is believed to be helpful in providing the reader with background information to facilitate a better understanding of the various aspects of the present invention. Accordingly, it should be understood that these statements are to be read in this light, and not as admissions of prior art.

Businesses are increasingly relying on information technology (IT) systems to gain a competitive advantage, such as by improving efficiency, profitability, and the like. With this technological proliferation, IT infrastructures are increasing in complexity. Consequently, the management of such IT infrastructures is becoming more difficult and, ultimately, more expensive for businesses to address themselves. Accordingly, some companies seek to reduce costs of IT infrastructure management by engaging specialized service providers with the experience and resources to more effectively manage IT infrastructures. In general, businesses choose to outsource because it lets them explicitly control how much they spend on IT, because the outsourcing providers give them cost savings won through economies of scale, and because the businesses are then free to focus on their own core competencies.

For these specialized service providers, management of a customer's IT infrastructure typically includes managing both technical components and business aspects relating to the infrastructure. For example, companies contract with independent service providers to perform logistical support services, such as management of their IT facilities. Further, specialized service providers can also be retained to provide a myriad of other IT services, such as creating and managing a customer call center, providing desktop personal computer support, or the like. Such outsourced services are referred to as managed services.

Many challenges exist in providing managed services and efficiently managing the technical and business aspects of a customer's IT infrastructure. In order to address each customer's unique needs, the business service provider must essentially repeat the service design process with every customer engagement. This is a tremendously complex and expensive undertaking requiring the management of an overwhelming number of components, dependencies, and other relationships. The diversity of customer requirements and the complexity of the solution space results in the customization of every solution and hinders continuity and automation, making the design process inefficient, labor-intensive, and time-consuming. In particular, one of the most difficult parts of solution design is how to coordinate the information flow between the people, teams, and regions involved in selling, designing, and implementing an IT solution for a customer.

DETAILED DESCRIPTION OF SPECIFIC EMBODIMENTS

Figure 1:
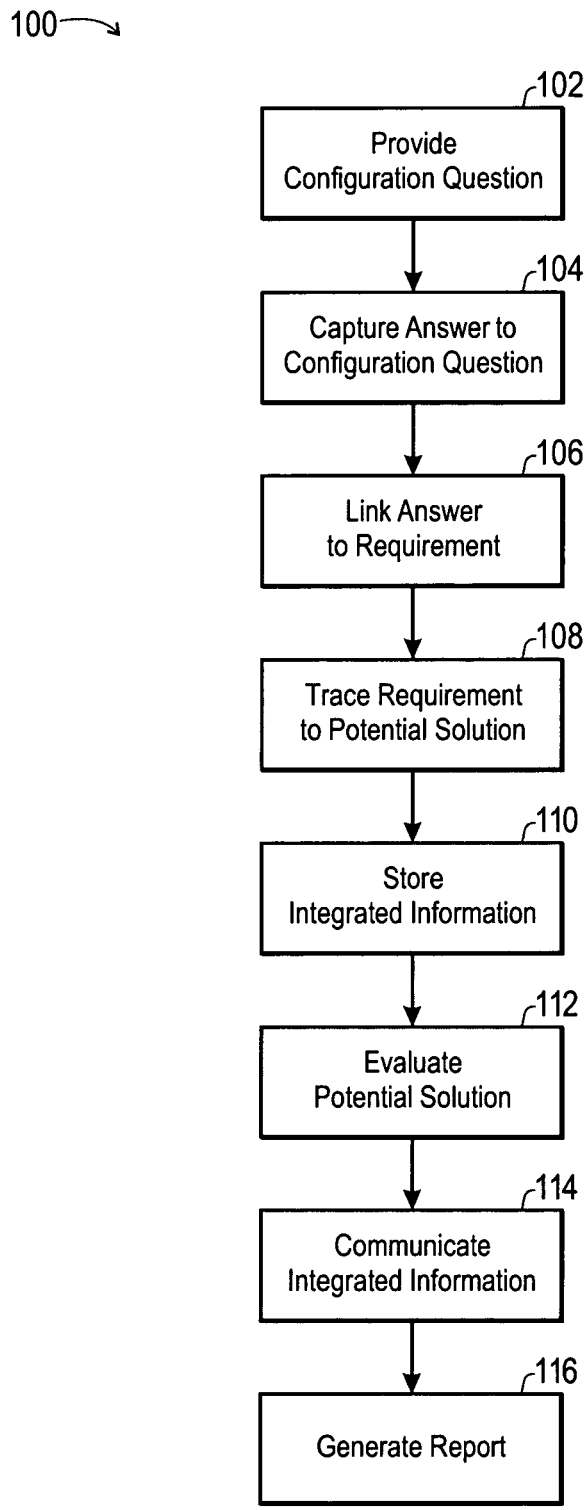
FIG. 1 is a flow chart illustrating exemplary steps of a process for service configuration management in accordance with one embodiment of the present invention.

One or more exemplary embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present techniques are particularly applicable to providing managed services for customers. Product and service development projects, such as managed service projects, typically evolve through three phases: "Strategic Assessment," "Design," and "Implementation." These phases are subdivided into smaller phases in accordance with embodiments of the present invention. For example, the "design" phase is subdivided into "Concept Development," "System Design," and "Component Design." In the case of managed services or consulting services, these phases of development are repeated for various customer engagements.

The phases referenced above typically require cooperation among various different entities (e.g., sales or pursuit teams, customers, and delivery teams). In the first phase, a determination is made as to whether the available services of a provider meet the needs of a customer organization. If a reasonable fit is found to exist, the second phase is entered wherein the provider and the customer discuss and attempt to agree on specifications relating to services that the provider will supply. For example, after determining that a provider is able to meet the needs of the customer, a pursuit team works with the customer to negotiate service specifications and define a particular architecture for the deal. After successfully completing the second phase, the third phase is entered wherein the provider actually supplies the agreed upon services to the customer. For example, the third phase generally includes a delivery team working with the customer to implement and deploy agreed upon solutions.

The first two phases of the deal configuration are referred to herein as a "front end" of the deal and the third phase is referred to herein as a "back end" of the deal. However, it should be noted that the front end and the back end of the deal are typically uncoordinated in some fashion. In programming terminology, it could be said that every transition between stages of configuration suffers from "impedance mismatch," i.e. the attempt to connect two systems that have very different conceptual bases. For example, the sales team thinks in terms of customer needs, while the design team thinks in terms of requirements and feature configuration, while the delivery team thinks in terms of resources, tools, and delivery processes.

Ideally, the agreed upon services would exactly match a standard set of services that the provider offers. However, in practice, the services agreed upon for each customer are usually uniquely configured because, typically, the IT needs of different customers diverge greatly. Accordingly, the majority of IT management solutions require significant customization. This customization increases the difficulty, risk, and expense in providing such services. Seemingly small errors in early stages of configuration can require significant expensive corrections from later stages. It should be noted that while an IT example is presented, those of ordinary skill in the art will appreciate that other applications of the present invention are possible. For example, embodiments of the present invention apply to any interactions between a customer with particular needs and a consultant with a set of solutions.

One issue that impacts the ability to configure custom services is a lack of continuity in the information involved in mapping and configuring services to meet customer needs. This discontinuity is a result of each phase having its own information silos of tools, processes, and data that are distinct from other phases and can reflect regional differences. Various data acquired during the deal configuration process is entered and interpreted in different information silos corresponding to distinct phases of the process. This method of information management, however, can lead to multiple repositories of information that are dedicated to certain aspects of a particular transaction or implementation irrespective of the transaction as a whole. Furthermore, the correlations between the various repositories are generally unmanaged. For example, in such a stovepipe information architecture, it is difficult for a sales team to get information located in another information silo, such as the profitability of signed deals, issues customers encountered, what solutions were the most difficult to implement, or what can be leveraged for the next customer. Similarly, for example, the implementation or delivery team typically has little information on what sales teams are selling, making it difficult to assign resources in an efficient and profitable manner. As a result of these information silos, it can be difficult to evaluate a completed implementation to determine which solutions were effective and which were ineffective, which, in turn, makes reuse of known good solutions difficult as well.

Various embodiments of the present invention address these issues and facilitate coordination between the stages of deal configuration, thereby reducing the risk and expense of providing managed services to customers. Some embodiments of the present invention include a service configuration management system and process for capturing and documenting the original language used in describing service requirements and for documenting the chain of rationale points leading from a specification to a solution. In one embodiment of the present invention, the service configuration process reduces the time and expense associated with ascertaining the needs of a customer, estimating the cost and availability of resources that could be employed to meet those needs, designing and implementing a given solution, and the like. Further, the service configuration management process builds up a knowledge base that facilitates future configuration mappings while facilitating auditing functions by providing traceability of a solution to the original requirement. Additionally, in another embodiment, the process includes the creation of standard templates comprising models and components. These standard templates provide a base level of knowledge that supports the mass customization of managed services by enabling individual standard service components to be selected and configured in a standardized manner.

Turning now to the drawings, FIG. 1 is a flow chart illustrating exemplary steps of a process 100 for service configuration management in accordance with an embodiment of the present invention. As illustrated, the process 100 includes providing a configuration question (block 102) and capturing an answer to the question (block 104). In the context of a service configuration, such as that described below with reference to FIG. 2, the configuration question is generally posed to a customer to explore the business needs of that customer. In present embodiment, capturing the answer includes entering the answer in a graphical user interface of a service configuration system, such as that described in greater detail below. Once captured, the answer is linked or translated to a requirement (block 106). As will be appreciated by one skilled in the art, such a requirement could be either standard or customized.

Subsequently, the requirement is traced to a potential solution (block 108). In one implementation, tracing the requirement to a potential solution includes using database tables, which contain mappings between requirements and solutions, and user interfaces. However, in an alternative implementation, tracing the requirement to a potential solution includes the use of constraints, logic, and constraint propagation, thereby facilitating documentation of the interrelationships between one or more requirements and respective potential solutions as well as the evolution of these relationships over a period of time.

The process 100 also includes storing integrated information (block 110). This integrated information includes a chain of rationale points, i.e., documentation of the steps or reasons leading to a particular design or decision, from the requirement to the potential solution having a link between these two points. Integrating such information and storing the chain of rationale points facilitates the provision of a coherent vision of a service configuration implementation to a plurality of parties, such as a pursuit team, a delivery team, and the customer. In alternative embodiments, the chain of rationale points can also include the configuration question, the answer, and various links between points, such as between the question and the answer or between the answer and the requirement. Additionally, in one embodiment, the integrated information also includes commitments made by the pursuit team, the delivery team, or the customer, such as a commitment of time or resources made with respect to a requirement or solution.

To facilitate mass customization of future deal configuration offerings, a subset of the integrated information can be stored as a standard offering for future configuration instances. Such standard offerings can reduce the time and expense of providing a managed service by facilitating reuse of previously designed solutions in place of fully customized solutions. As would be appreciated by one skilled in the art, a subset of the integrated information can include the full set of integrated information, or any portion thereof.

The illustrated process 100 also includes evaluating the potential solution against the requirement (block 112), and communicating some or all of the integrated information (block 114) to a user, such as a member of the delivery team, a member of the pursuit team, or the customer. In the presently illustrated embodiment, this communication is initiated in response to any one of a variety of occurrences. For instance, communication of the integrated information is possible in response to a change in the integrated information, such as a change in the answer to the configuration question, the requirement, or the potential solution, or a breaking of a link in the chain of rationale points. In the present embodiment, such communication includes generating an integrated view configured to synchronize a plurality of users, such as a pursuit team and a delivery team, thereby presenting a coherent view of a service configuration progression to a number of disparate entities involved in the service configuration process. Further, such communication could also be the generation and distribution of worksheets for the pursuit and delivery teams. In various embodiments, the worksheets can capture the progress of the pursuit and delivery teams, track decisions regarding design and deployment of a solution, or document additional steps for completing an implementation. The process 100 additionally includes generating a report comparing the potential solution to the requirement (block 116).

Figure 2:
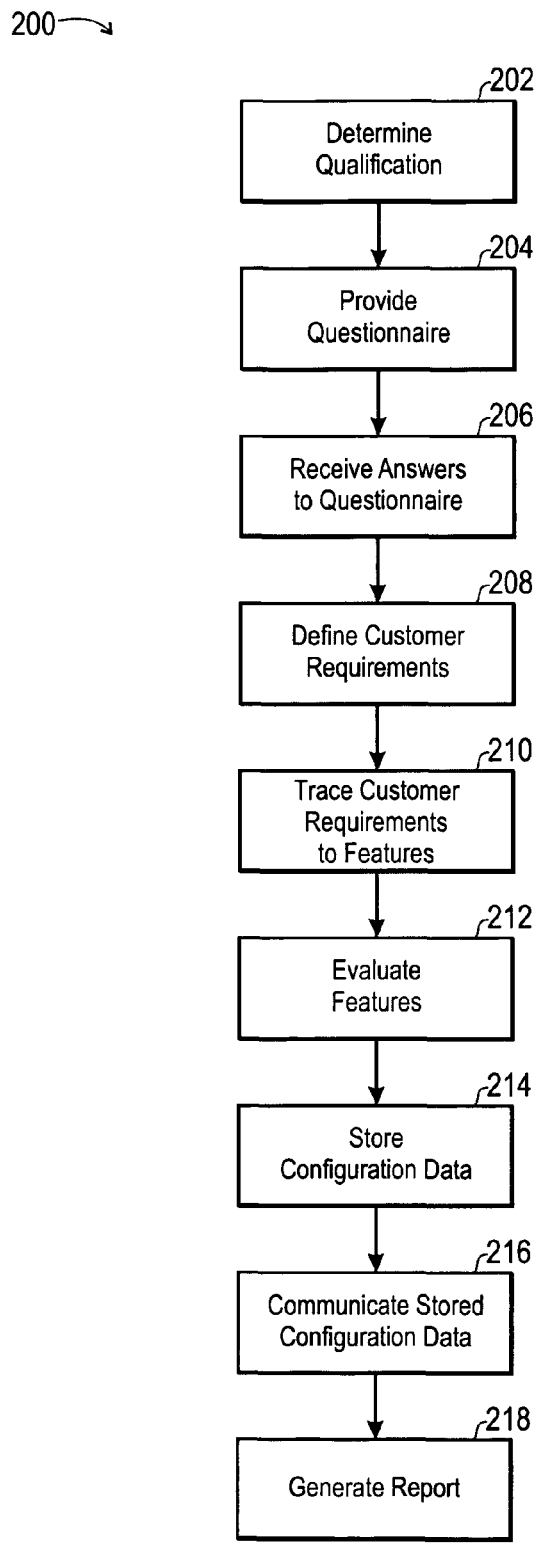
FIG. 2 is a flow chart illustrating an alternative process for service configuration management in accordance with one embodiment of the present invention.

FIG. 2 illustrates an alternative process 200 for service configuration management in accordance with an embodiment of the present invention. The process 200 includes determining whether a potential deal is qualified (block 202). In one embodiment, the determination of qualification includes ascertaining whether the business needs of a customer overlap with the capabilities of a corporation providing a managed service.

Once the deal is qualified, a requirement questionnaire is provided to the customer (block 204). In one embodiment, the questionnaire is provided to the customer during a customer interview, which can be conducted by one or more persons associated with the service provider, such as a pursuit team. Particularly, the service provider or pursuit team utilizes the questionnaire to ascertain business needs of the customer and capture the customer requirements in the language of the pursuit team. As discussed below, in one embodiment, these questions and answers are stored in a database to facilitate auditing and traceability functions. It should be noted that the questionnaire can be assembled dynamically according to the particular needs and configuration desired by each customer. The questions on the questionnaire can be selected or designed based on a variety of sources, including design rules of the service provider, the configuration catalog containing previously implemented solutions with their rationale and feedback on deployment and exploitation, and a deal catalog describing the services that a provider is willing to offer. In the present embodiment, questions are generated by the delivery team and stored for future use, although questions can be established by other persons in full accordance with the present techniques. Further, the questionnaire document also gathers requirements, features, and details that facilitate the design and implementation of a solution. Still further, the questionnaire is also capable of storing the results of a feature evaluation as noted below.

Once answers to the questionnaire are received (block 206), the set of answers is used to define or establish a set of customer requirements (block 208). Subsequently, the process 200 includes tracing the customer requirements to a set of service features (block 210). In the present embodiment, tracing the customer requirements to such features can be facilitated through the use of database tables containing mappings between requirements and solutions, in addition to constraints, logic, and constraint propagation. It should be noted that the steps of defining customer requirements (block 208) and tracing such requirements to features (block 210) could be performed by different persons or departments. For instance, in the context of service configuration, a pursuit team can define the customer requirements based on the answers provided by the customer to a questionnaire, while a delivery team could connect these requirements to completed configuration forms for the service features used in a potential solution. Once the customer requirements are derived, of course, these requirements can be provided to the customer for approval, thereby reducing the chances of a miscommunication between the customer and the service provider.

The process 200 also includes evaluating the service features for satisfaction of the customer requirements (block 212) and storing the configuration data and evaluation results in a database (block 214). In the present embodiment, the configuration data includes the answers to the questionnaire, the requirements associated with the answers, and the features derived from the requirements, as well as the relationships betweens these elements. However, in alternative embodiments the configuration data also includes questions from the configuration questionnaire, commercial and legal documents related to a service configuration instance, and documents related to the delivery of an agreed upon service. All or some portion of the storage configuration data is collected and saved in a database for reuse in future deal configurations, thereby facilitating the mass customization of a managed service offering. Still further, the stored configuration data can be used to update the design rules, the configuration catalog, and the deal catalog discussed above. Additionally, the storage of this configuration data facilitates the integration of a service configuration design and implementation across disparate information silos, allowing the auditing of a proposed or implemented solution.

More particularly, the storage of configuration data facilitates the integration of service configuration information by bridging barriers between a plurality of information silos. For instance, in a service configuration context, the pursuit team generally populates and accesses one information silo containing data relevant to the needs and requirements of a customer, while the delivery team generally populates and relies upon a second information silo directed to delivery of a managed service. The present techniques provide connections between these silos, allowing both the delivery and pursuit teams to more easily access information in other silos while increasing the coherence of these two teams during the design and implementation of a particular customer solution.

The presently illustrated embodiment also includes communicating stored configuration data (block 216) to a user, such as a member of the pursuit or delivery teams. In one embodiment, such communication includes generating one or more coherent views of the contemplated deal for the pursuit and delivery teams, thereby synchronizing these two teams and providing a single coherent vision to those involved in designing and implementing a business solution. This synchronization also facilitates efficient and consistent communication with the customer by members of the pursuit and delivery teams. In the present embodiment, the views produced are capable of referring back to the customer interview and the original requirements derived therefrom.

Additionally, the process 200 includes generating a report (block 218) comparing a set of service features to the customer requirements. As will be appreciated, the generated report could also include other information, such as a sequence of rationale points from the customer answers to the set of service features, the progress of an implementation of a customer solution, links between requirements and customer needs established in a qualification questionnaire, or the like.

Figure 3:
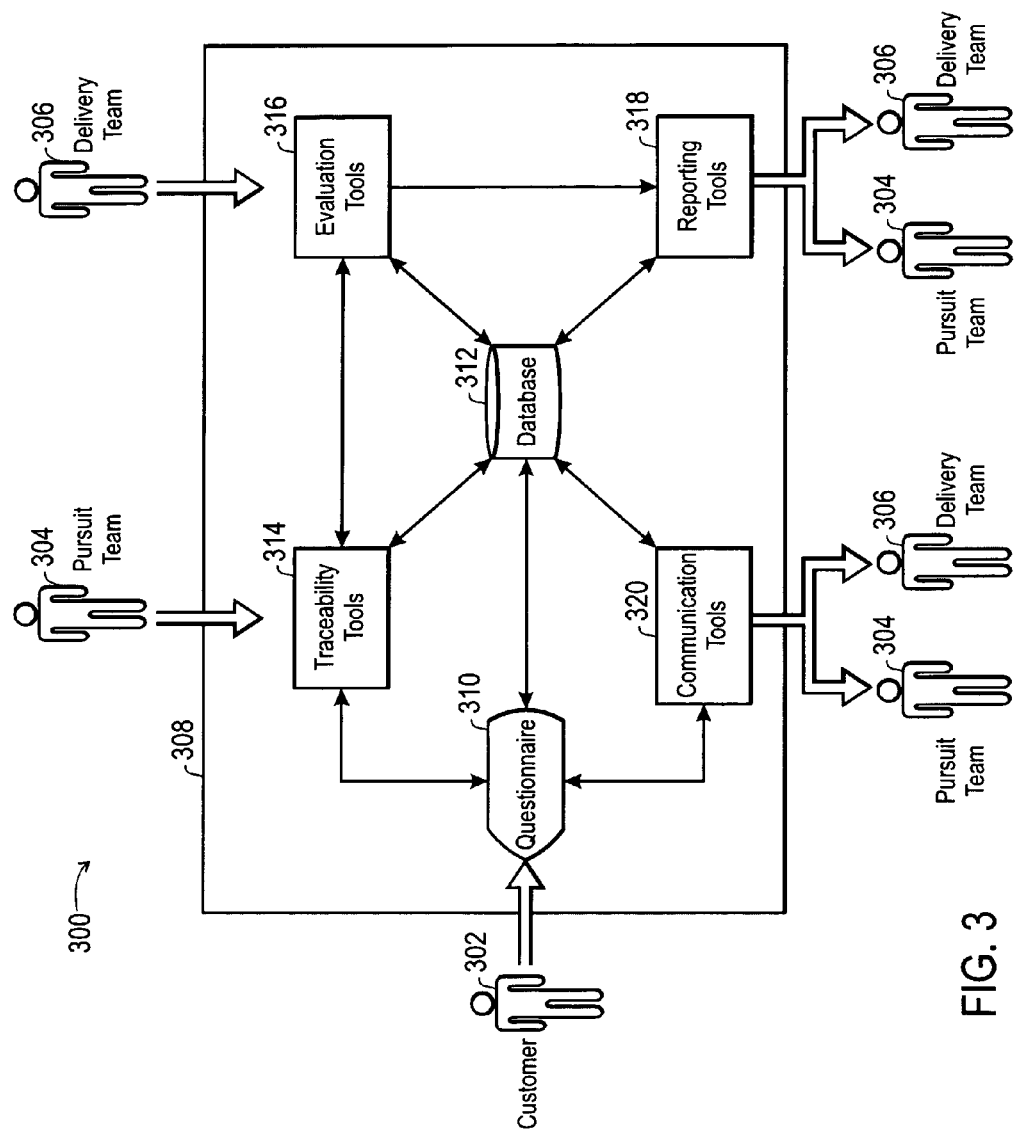
FIG. 3 is a block diagram representing exemplary interactions between parties and components used in service configuration in accordance with one embodiment of the present invention.

A service configuration interaction diagram 300 is provided in FIG. 3 in accordance with one embodiment of the present invention. Diagram 300 generally illustrates interactions between a customer 302, a pursuit team 304, a delivery team 306, and a service configuration system 308 in a service configuration instance. In the present embodiment, the pursuit team 304 engages the customer 302 with a questionnaire 310 to formalize the customer requirements and determine the services expected by the customer 302. In the present embodiment, questionnaire 310 is provided through a questionnaire user interface. As would be appreciated by one skilled in the art, the questionnaire user interface can be designed with web application server development tools or, alternatively, can be designed through other software tools or applications, such as a spreadsheet application. The questionnaire 310 reads the questions from a database, such as database 312, and defines the user interfaces and views for the pursuit team 304 and the delivery team 306. The questionnaire 310 also structures the interview process and gathers the resulting customer answers and requirements into one or more databases, such as database 312. As noted above, the questionnaire can be dynamically composed according to the service requirements of the customer 302. Moreover, the dynamic composition reduces the number of questions asked a customer while increasing the relevancy of these questions by focusing on important aspects of a service design and implementation by relying, in part, on past experience and corporate knowledge. The answers to the questions of questionnaire 310 are stored by the service configuration system 308, such as in database 312, and input into traceability tools 314.

The traceability tools 314 are used by the pursuit team 304 when making and documenting links between user requirements and potential solutions to those requirements and links between questions and the user requirements. Particularly, the traceability tools 314 are employed to link customer requirements to one or more solutions proposed by pursuit team 304. In one embodiment, the traceability tools 314 include a table linking requirements to potential solutions. In alternative embodiments, however, the traceability tools 314 could facilitate automation based on logic or a language capable of defining links between requirements and solutions, as well as maintaining these links as the service configuration system 308 evolves. In the present embodiment, traceability tools 314 generally include database pivot tables or spreadsheets. In one embodiment, the traceability tools 314 use tables such as those in a spreadsheet or HTML table to present the relationship. In an alternative embodiment, the traceability tools 314 use a sequence of values sorted by one aspect to show its relationship to another aspect.

Further, evaluation tools 316 are utilized by the delivery team 306 to measure the proposed solutions against the customer requirements. These tools can be employed to audit the delivery or design of a particular solution. For instance, in one embodiment, the evaluation tools 316 define the metrics for deliverable services and allow delivery team 306 to assess the performance of solutions and prove their validity against customer requirements. As would be appreciated by one skilled in the art, evaluation tools 316 can comprise a variety of heuristic and analytic models in full accordance with the present techniques.

Reporting tools 318 are provided to summarize the deal configuration in views corresponding to both pursuit team 304 and delivery team 306 and provide a technical analysis of a service configuration design and implementation. The reporting tools 318 are also capable of providing further information, such as the rationale for the solution as well as related metrics measurements. The reporting tools 318 are capable of summarizing the proposed solution, its architecture, its performance, its compliance with respect to the requirements, and the solution actually delivered drawing together output from the other tools. These reporting tools 318 also provide a delivery report to be sent to the client when delivering the services.

Communication tools 320 are provided to facilitate information flow between the pursuit team 304 and the delivery team 306 as the process progresses, including through the design and implementation of a particular solution. The communication tools 320 facilitate synchronization of the pursuit team 304 and the delivery team 306, furthering awareness of the latest evolution of a service undertaking. The communication tools 320 can also provide a list of the documents sent to the customer 302. Further, these communication tools 320 are capable of raising issues to pursuit team 304 and delivery team 306 if causal links are broken in the system, such as between a requirement and a solution. It should also be noted that these tools 320 facilitate interaction between the pursuit team 304 and the delivery team 306 by allowing the proposal of alternative solutions to the requirement, the sharing of performance measures, the initiating and documenting of technical discussions regarding a service configuration, or the like. In the present embodiment, communication tools 320 are generally based on email servers or websites. The communication tools 320 include tools for generating the aforementioned views and worksheets, which further facilitate communication and maintain coherence between various parties, such as a pursuit team and a delivery team. It should also be noted that, in the present embodiment, these view and worksheet generation tools, as well as the reporting tools 318, can be called at any point during the service configuration process to view and document results in a present stage.

Figure 4:
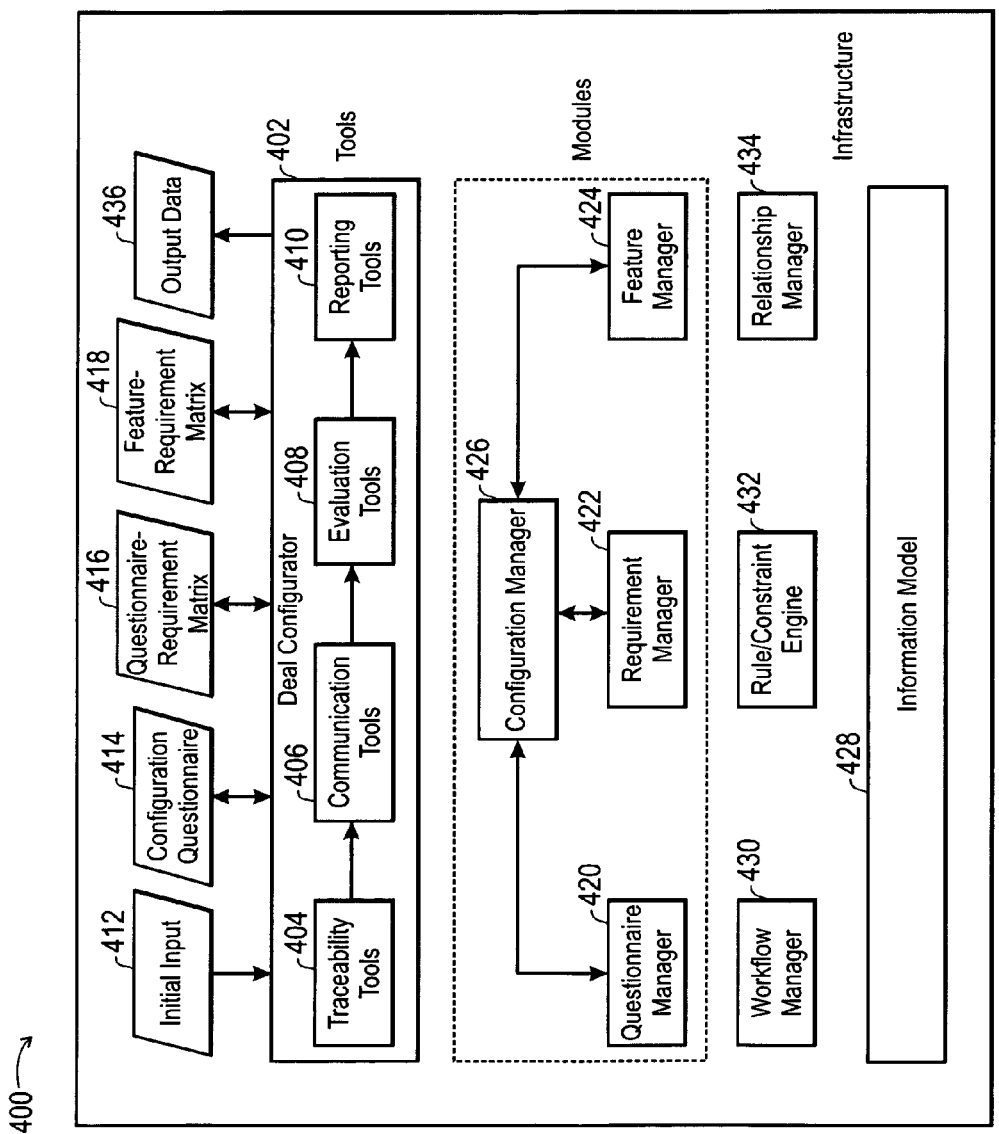
FIG. 4 illustrates the architecture of an exemplary service configuration system in accordance with one embodiment of the present invention.

The architecture of an exemplary service configuration system 400 is provided in FIG. 4 in accordance with one embodiment of the present invention. The system 400 includes a service or deal configurator 402 having four suites of tools similar to those discussed above: traceability tools 404, communication tools 406, evaluation tools 408, and reporting tools 410. The deal configurator 402 receives a variety of initial input data 412. In the present embodiment, this data 412 includes relationship specifications, requirement templates, standard service features, and one or more questionnaires. A variety of questionnaires can be utilized by the deal configurator 402, including qualification questionnaires, service configuration questionnaires, cost-analysis questionnaires, tower configuration questionnaires for configuring a group of services, and general configuration questionnaires.

In the present embodiment, initial input 412 is provided by way of graphical user interfaces. However, the initial input data 412 can be entered into the deal configurator 402 in some other fashion in accordance with the present techniques. Configuration forms or questionnaire 414 includes questions asked to, and answers received from, a customer. The system 400 also includes a questionnaire-requirement matrix 416, documenting links between the questionnaire answers and associated requirements, and a feature-requirement matrix 418, containing mappings between the requirements and associated features of a potential solution.

The tools of deal configurator 402 are built on a plurality of modules that manage specific aspects of service configuration. The system 400 includes a questionnaire manager module 420, a requirement manager module 422, a feature manager module 424, and a configuration manager module 426. In the present embodiment, a service configuration includes a set of selected service features along with parameters and specified values. These modules handle the specification of appropriate parameters and values for the particular aspects they respectively manage.

Particularly, the questionnaire manager 420 stores, manages, and retrieves questionnaires associated with configurable services and responses to questionnaires associated with deal configurations. The requirement manager 422 is capable of storing, managing, and retrieving both template and configured requirements related to standard and custom service offerings, respectively. The requirement manager 422 also manages the associations between configured requirements and responses to questionnaire questions via traceability tools 404. The feature manager 424 is configured to store, manage, and retrieve both template and fully customized service feature configurations. As would be appreciated by one skilled in the art, a service feature configuration could consist entirely of custom features, standardized features of a template reflecting industry best practices or experience, or could include a combination of standardized and custom features. Configured features are associated with configured requirements, and these associations are managed by the feature manager 424 through use of traceability tools 404. The configuration manager 426 is provided to store, manage, and retrieve the service configuration process flows associated with configurable services.

The various tools of deal configurator 402 and the underlying modules utilize a common information model 428 representing the core concepts used in the system. In the present embodiment, these tools and modules are built on a supporting infrastructure including workflow manager 430, a rule or constraint engine 432, and a relationship manager 434. This supporting functionality can either be implemented directly into the system 400 or provided by external, third-party tools.

Figure 5:
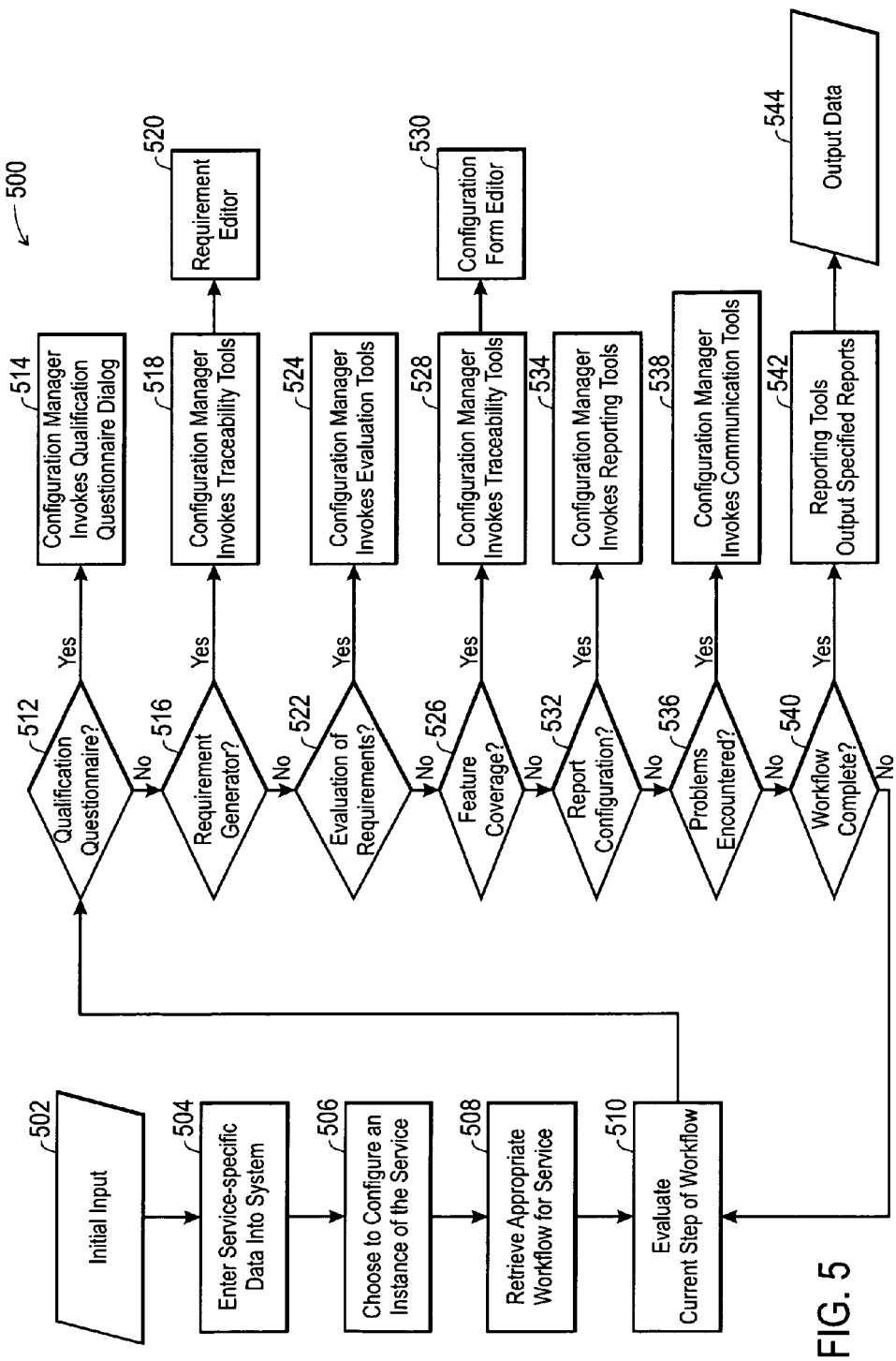
FIG. 5 is a flow chart illustrating interactions between components of an exemplary service configuration system in accordance with one embodiment of the present invention.

FIG. 5 is a flow chart 500 illustrating interactions between components of an exemplary service configuration system in accordance with one embodiment of the present invention. As illustrated, initial input 502 is entered into the system. As discussed above, such input can include a variety of questionnaires, standard service features, requirement templates, and relationship specifications. In the exemplary embodiment illustrated, the delivery team enters service specific data into the system (block 504). The pursuit team then chooses configure an instance of the service (block 506). Subsequently, the configuration manager retrieves the appropriate workflow for the service (block 508) and evaluates the current step of the workflow (block 510). If the current step of the workflow is presenting a qualification questionnaire (block 512), the configuration manager invokes qualification questionnaire dialogue (block 514). In a requirement generation workflow step (block 516), the configuration manager invokes traceability tools, which use the questionnaire manager to drive the questionnaire (block 518) and requirement editor (block 520). If the current workflow step is the evaluation of the requirements (block 522), the configuration manager invokes evaluation tools and uses the requirement manager to present and populate the questionnaire-requirement matrix (block 524).

If the current step of the workflow is determining feature coverage (block 526), the configuration manager can invoke traceability or evaluation tools (block 528) and a configuration form editor (block 530), which use the feature manager to present and populate the feature-requirement matrix. Further, if reporting the configuration is the current step of the workflow (block 532), the configuration manager invokes reporting tools to configure report specifications (block 534). If it is determined that a problem has arisen (block 536), the configuration manager can invoke communication tools to notify the service provider, the customer, or both, of the issue to facilitate efficient resolution (block 538). Finally, if the workflow is complete (block 540), the reporting tools output specified reports (block 542). The data output from these reporting tools (block 544) can include a custom work statement, a report on requirement coverage, the implemented service configuration, or the like.

Lastly, the present techniques may employ application instructions on a non-transitory, computer-usable medium where the instructions, when executed, effect service configuration management. More specifically, the instructions are adapted to provide a configuration question and capture an answer to the configuration question, link the answer to a requirement, trace the requirement to a potential solution. The application instructions are also adapted to store integrated information including the requirement, the potential solution, and a link between the requirement and the potential solution. The application instructions may also include instructions adapted to evaluate the potential solution for satisfaction of the requirement, generate a report of a comparison of the potential solution to the requirement, and/or communicate integrated information including the requirement and the potential solution to a user.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method for service configuration management comprising:
    providing a configuration question via a processor and a questionnaire user interface coupled to a database;
    capturing an answer to the configuration question, including entering the answer in a user interface implemented via a software tool and the processor;
    determining a link between the answer and a requirement via the processor and a questionnaire-requirement matrix stored in a service configuration system;
    tracing the requirement to a potential information technology (IT) solution using the processor and database tables that comprise mappings between requirements and solutions; and
    storing integrated information in the service configuration system via the processor, the integrated information comprising the requirement, the potential solution, and the link between the requirement and the potential solution.

2. The method of claim 1, further comprising evaluating the potential solution for satisfaction of the requirement.

3. The method of claim 1, further comprising generating a report comprising a comparison of the potential solution to the requirement.

4. The method of claim 1, wherein the integrated information includes the answer and the link between the answer and the requirement.

5. The method of claim 4, wherein the integrated information includes the configuration question and a link between the configuration question and the answer.

6. The method of claim 1, further comprising communicating a subset of the integrated information to a user, wherein communicating the subset of the integrated information comprises generating an integrated view configured to facilitate synchronization of a plurality of users.

7. The method of claim 6, wherein communicating the subset of the integrated information is performed in response to a change in the integrated information.

8. The method of claim 7, wherein the change in the integrated information is a change in the requirement.

9. The method of claim 6, wherein communicating the subset of the integrated information is performed in response to a breaking of the link between the requirement and the potential solution.

10. The method of claim 1, further comprising establishing a subset of the integrated information as at least one of a standard offering or a standard question for future configuration instances.

11. The method of claim 1, wherein the integrated information comprises a commitment made with respect to the requirement or the potential solution.

12. A method for service configuration management comprising:
providing a requirement questionnaire to a customer via a processor and a questionnaire user interface coupled to a database;
receiving a set of answers to the requirement questionnaire and storing the set of answers in a service configuration system via the processor and a user interface;
defining a set of customer requirements using the set of answers, the processor, and a matrix stored in the service configuration system;
tracing the set of customer requirements to a set of information technology (IT) service features using the processor and database tables comprising a table linking customer requirements to potential service features;
evaluating via the processor the set of service features for satisfaction of the customer requirements; and
storing configuration data via the processor in a database to facilitate the integration of deal configuration information across a plurality of information silos, the configuration data including the set of answers, the set of requirements, the set of service features, and a set of connections therebetween.

13. The method of claim 12, further comprising:
implementing a customer solution comprising one of the service features of the set of service features; and
generating a report comparing the set of service features to the set of customer requirements, wherein the report includes a sequence of rationale points from the answers to the set of service features.

14. The method of claim 12, wherein the requirement questionnaire is dynamically composed using needs expressed by the customer, and according to a configuration of the requirement questionnaire desired by the customer.

15. The method of claim 12, further comprising communicating stored configuration data to a user, wherein communicating stored configuration data comprises generating a coherent view for synchronization of a pursuit team and a delivery team.

16. The method of claim 12, further comprising defining a subset of the stored configuration data as at least one of a standard offering or a standard question for future deal configurations.

17. A computer-usable medium that stores instructions that, when executed by a computer processor, effect service configuration management, the instructions comprising:
instructions adapted to provide a configuration question and capture an answer to the configuration question;
instructions adapted to link the answer to a requirement;
instructions adapted to trace the requirement to a potential information technology (IT) solution using data retrieved from database tables comprising mappings between requirements and solutions; and
instructions adapted to store integrated information comprising the requirement, the potential solution, and a link between the requirement and the potential solution.

18. The computer-usable medium of claim 17, further comprising instructions adapted to evaluate the potential solution for satisfaction of the requirement.

19. The computer-usable medium of claim 17, further comprising instructions adapted to generate a report comprising a comparison of the potential solution to the requirement.

20. The computer-usable medium of claim 17, further comprising instructions adapted to communicate integrated information comprising the requirement and the potential solution to a user.

* * * * *